US012037845B2

(12) United States Patent
Klimes et al.

(10) Patent No.: US 12,037,845 B2
(45) Date of Patent: Jul. 16, 2024

(54) ROLLER SHAFT WITH A REINFORCEMENT

(71) Applicant: Bestadom, s.r.o., Kosikov (CZ)

(72) Inventors: Petr Klimes, Kosikov (CZ); Bernard Mullie, Kosikov (CZ)

(73) Assignee: Bestadom, s.r.o., Kosikov (CZ)

( * ) Notice: Subject to any disclaimer, the term of this patent is extended or adjusted under 35 U.S.C. 154(b) by 331 days.

(21) Appl. No.: 17/283,660

(22) PCT Filed: Oct. 29, 2019

(86) PCT No.: PCT/EP2019/079519
§ 371 (c)(1),
(2) Date: Apr. 8, 2021

(87) PCT Pub. No.: WO2020/089220
PCT Pub. Date: May 7, 2020

(65) Prior Publication Data
US 2022/0010617 A1 Jan. 13, 2022

(30) Foreign Application Priority Data
Oct. 29, 2018 (CZ) ................................ CZ2018-585

(51) Int. Cl.
*E06B 9/50* (2006.01)
*E06B 9/44* (2006.01)
*E06B 9/68* (2006.01)

(52) U.S. Cl.
CPC .................. *E06B 9/50* (2013.01); *E06B 9/44* (2013.01); *E06B 9/68* (2013.01)

(58) Field of Classification Search
CPC ..... E06B 9/40; E06B 9/42; E06B 9/50; E06B 9/44; E06B 2009/1713; E06B 2009/407; E06B 9/68
See application file for complete search history.

(56) References Cited

U.S. PATENT DOCUMENTS 516,018 A * 3/1894 Lauer ........................ B60J 1/205
1,424,572 A * 8/1922 Fielden ...................... E06B 9/44 242/613.5
3,739,832 A * 6/1973 Sivin .......................... E06B 9/70 160/310
8,299,734 B2 10/2012 Mullet
(Continued)

FOREIGN PATENT DOCUMENTS

CN 2446272 Y 9/2001
CN 103573135 2/2014
(Continued)

OTHER PUBLICATIONS

International Search Report received in PCT/EP2019/079519 mailed Feb. 5, 2020.
(Continued)

*Primary Examiner* — Daniel P Cahn
*Assistant Examiner* — Matthew R. Shepherd
(74) *Attorney, Agent, or Firm* — Suzannah K. Sundby, Esq.; Canady + Lortz LLP

(57) ABSTRACT

A roller winding mechanism having a winding shaft which is created as a tube attached at one end to a drive which is coupled to the frame and at its other end mounted on a bearing on a pivot fixed to the frame.

14 Claims, 4 Drawing Sheets

(56) References Cited

U.S. PATENT DOCUMENTS

| | | | | |
|---|---|---|---|---|
| 2004/0129850 | A1* | 7/2004 | Kirby | E06B 9/42<br>248/266 |
| 2005/0077017 | A1* | 4/2005 | Ramsey | A63J 1/02<br>160/238 |
| 2005/0150615 | A1* | 7/2005 | Bousson | E06B 9/60<br>160/313 |
| 2011/0024064 | A1* | 2/2011 | Ng | E06B 9/60<br>160/317 |
| 2013/0276995 | A1* | 10/2013 | Mullet | E06B 9/72<br>160/310 |
| 2013/0312920 | A1* | 11/2013 | Mullet | E06B 9/72<br>160/310 |
| 2013/0333848 | A1* | 12/2013 | Mullet | E06B 9/50<br>160/310 |
| 2014/0157547 | A1* | 6/2014 | Chen | E06B 9/62<br>16/400 |

FOREIGN PATENT DOCUMENTS

| | | | | |
|---|---|---|---|---|
| CN | 107524403 | | 12/2017 | |
| CN | 108397118 | | 8/2018 | |
| DE | 19843044 | | 6/2007 | |
| DE | 102010034614 | A1 * | 2/2012 | E04F 10/00 |
| EP | 1748121 | | 1/2007 | |
| WO | 2013129916 | | 9/2013 | |

OTHER PUBLICATIONS

Written Opinion received in PCT/EP2019/079519 mailed Feb. 5, 2020.

* cited by examiner

--Prior Art--

ROLLER SHAFT WITH A REINFORCEMENT

BACKGROUND OF THE INVENTION

Field of the Invention

The invention relates to a roller winding mechanism of various types of roller winding devices or roller shutters, such as fabric roller shutters, window roller shutters, roller garage doors, fire roller shutters, etc.

Description of the Related Art

Blinds are a type of shielding, which serves to effectively protect the interior especially from the sun's rays, but also as its attractive and practical decorative element. The blinds further may have an acoustic function, provide safety through fire retardants, can be used as a screen for projectors and as a light regulator. The blinds can be divided into indoor and outdoor in terms of arrangement with respect to the shaded area.

The basis of the roller blind winding mechanisms is a winding shaft onto which a screening element, such as lamella armor, fabric or foil, is wound. The size of the winding shaft is dimensioned to the weight of the winding shielding element and, especially in heavy fabric roller blinds, the deformation of the shaft is critical as it causes the undulation of the fabric which is considered to be a visual defect. Shaft size is usually limited by space for installation or cassette, in which the wound shielding element is hidden.

The shaft stiffness is determined mainly by its diameter, the maximum deflection can be determined according to the formula for the maximum deflection of the free beam with uniform continuous load:

$$w_{max} = \frac{5ql^4}{384EJ},$$

where q is the continuous load [N/mm]—given by the weight of the rolled roller shutter plus the weight of the load plus the weight of the shaft itself, I is the beam length [mm], E is the Young's modulus [MPa], J is the axial quadratic inertia moment of the cross-section [$mm^4$].

Thus, the bending stiffness of the tubular shafts is determined by the type of material and the cross-sectional characteristics, with the use of rolled galvanized steel or drawn aluminum, exceptionally carbon composite, commonly used. In the case of pipes, the diameter is significantly influenced, but less the wall thickness, which mainly increases the weight of the winding shaft. The diameter of the winding shaft is a limiting factor for the maximum roller blind width and for large fabric roller blinds the shaft can be up to 160 mm in diameter, while for a conventional fabric roller blind for windows up to two meters wide, a pipe with 28 mm diameter is sufficient. The consequence is a high weight of the whole device and the need for larger dimensioning of all related components. The ultimate consequence is the high cost, high demands on the size of the space and the bearing capacity of the anchoring for such a system. If the roller shutter is wide, the roller shutter must be solved and supported by brackets where the roller shutter is divided. Furthermore, if more windings are required on the winding shaft, it is generally necessary to use a smaller diameter winding shaft, which in turn leads to greater deflection and greater problems as described above.

US2014/0157547 discloses an electrical system for controlling the roller shaft. One end of the elastic band is firmly anchored on the shaft, with the remainder of the band being wound in a non-lowered blind state on a spool arranged on an axis parallel to the axis of the shaft. When the roller blind is lowered, this pre-tensioned belt is wound on the shaft and helps to fix the roller blind when the roller shutter stops. When rewinding, the belt is rewound on the spool by springing to help the electric motor. Thus, the electric motor may have lower power. The document does not solve the problem of the roller shaft deflection.

US2013/0333848 A1 discloses an electrical system for controlling the hollow shaft of a roller shutter. Inside the shaft there is a concentrically arranged carrier with a drive unit, which comprises an electric motor and a control unit, and next to this drive unit there is arranged a spring-loaded set of torsion springs in the axis of the carrier. These torsion springs are preloaded when lowering the roller shutter, and the accumulated energy of the springs helps to wind the roller shutter when winding the roller shutter. The above mentioned document also does not solve the problem of the roller shaft deflection.

WO2013/129916 A1 discloses an electric roller blind control system with two concentrically arranged drive units. Between the drive units, in the preferred embodiment, an auxiliary spring unit is wound concentrically on the carrier. This unit comprises a spring-loaded torsion spring, with one end of the spring wire attached to the carrier and the other end attached to the roller shaft. When the roller blind is lowered, this torsion spring preloads and when the roller blind is rolled back, the accumulated energy of the spring helps to wind the roller blind. Also, this document does not solve the problem of the roller shaft deflection.

It is an object of the present invention to provide a roller winding mechanism that eliminates unwanted deflection of the winding shaft, thereby eliminating the problems.

SUMMARY OF THE INVENTION

The above-mentioned drawbacks are eliminated by the roller winding mechanism according to the invention, characterized in that it comprises a shaft reinforcement which is inserted into the roller shaft and anchored firmly to the frame on the side opposite to the drive, the bending direction of the shaft reinforcement (6) being opposite to the expected deflection of the winding shaft (2) and the initial curvature of this reinforcement (6) is such that its deformation along its length is such that its axis at maximum deformation coincides with the axis of the originally non-deformed winding shaft (2) and the reinforcement (6) is provided with rolling support bearings (10) mutually spaced apart along its length.

In a preferred embodiment the reinforcement has the shape of a hollow or solid profile and between the inner diameter of the support bearings and the outer surface of the reinforcement there are shaped inserts with holes corresponding to the cross-sectional shape and size of the reinforcement and the cylindrical outer surface of the inserts corresponds to the shape and size of the inner surface of the inner ring of the support bearings to allow rotation of the winding shaft relative to the reinforcement.

BRIEF DESCRIPTION OF THE DRAWINGS

The invention will be introduced with use of drawings, where.

DETAILED DESCRIPTION OF THE INVENTION

Figure 1:
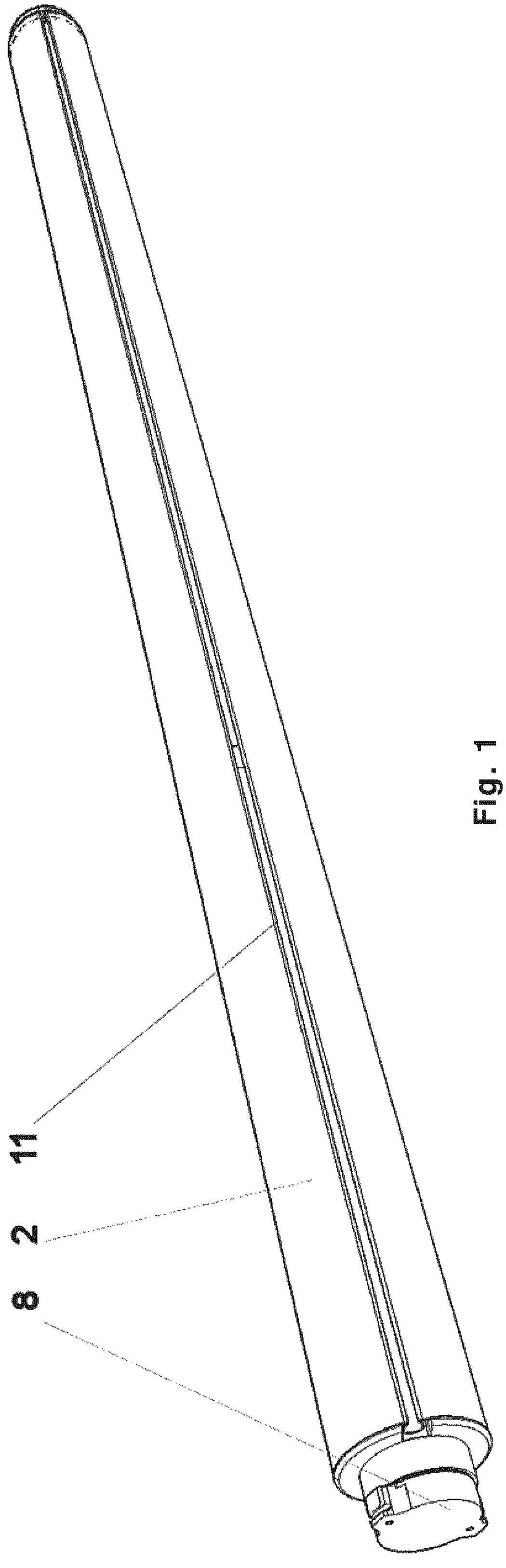
FIG. 1 is a perspective view of a roller winding mechanism, comprising a mounted winding shaft.

"Rolling support bearings" as described herein comprise any bearings which are suitable to allow a rotational movement of the winding shaft with respect to the fixed reinforcement shaft. These bearings may comprise rolling elements such as rolling-element bearings, but can also be plain bearings or rotational sliding bearings without moving or rolling elements.

The "yield strength" or "yield point" as described herein is defined with an offset yield point of 0.2% plastic strain.

In a first aspect, the invention relates to a roller winding mechanism comprising a winding shaft (2) which is created as a tube wherein the roller winding mechanism comprises a shaft reinforcement (6) which is curved, which shaft reinforcement is provided with support bearings (10) mutually spaced apart along its length, which shaft reinforcement (6) is inserted into said winding shaft (2) so that said winding shaft (2) can rotate independently from said shaft reinforcement (6).

In order to insert the curved reinforcement shaft, provided with support bearings, into the winding shaft, the curved reinforcement shaft will need to be straightened. This straightening of the reinforcement shaft is preferably an entirely elastic deformation. The elastic deformation of the reinforcement shaft will act as a weight countering force onto the winding shaft. This force is ideally opposite to the expected deformation of the winding shaft under any load. Typically this load will be the result of the weight the roller blind system supports, in particular its own weight, the weight of any blinds connected thereto as well as any loads to straighten said blinds.

While the force is ideally opposite to the expected deformation, so the force of the reinforcement shaft counters the weight acting upon the winding shaft entirely, even a non-ideal scenario is beneficial over the prior art. That is to say, the resulting force will be the vector sum of these forces. As long as the norm of the resulting vector is smaller than the norm of the weight acting on the winding shaft, the deflection by the winding shaft will be diminished considerably.

The reinforcement shaft thus results in a weight countering force acting onto the winding shaft. This force can easily be designed to be opposite to the weight acting on the winding shaft. As a result of these opposing forces, the stress due to the weight of the fabric on the roller shaft is significantly reduced. This improves the dimensional stability and rigidity of the roller shaft. In particular, it prevents hanging of the roller shaft under the weight of the fabric. This additionally allows the use of fabrics with a higher specific weight. It also allows the use of roller shafts with a lower diameter. It allows making roller winding mechanisms of a longer length. Lastly it advantageously allows the use of roller shafts with a lower Young modulus.

In a preferred embodiment, the straightening of the reinforcement shaft is an elastic deformation, that is to say below the yield point of the winding shaft. The stress applied on the reinforcement shaft which results in a plastic deformation of this shaft does not result in the desired weight countering force. It is only elastic deformation which produces the desired effect. Consequently it is preferred that there is no plastic deformation on the winding or reinforcing shaft during the insertion of the reinforcement shaft or during operation.

Consequently, it is desired that the curved reinforcement shaft can be straightened, that is to say inserted into a straight winding shaft, without surpassing its yield point. In practical terms the offset yield point of 0.2% plastic strain should not be surpassed when inserting the curved reinforcement shaft into the winding shaft.

In a preferred embodiment, the roller winding mechanism according to the first aspect wherein the shaft reinforcement has a central part in between both ends, wherein the shaft reinforcement has an extremum in said central part.

An extremum as described herein comprises a point where the first derivative of curve that represents the shape of the curved reinforcement shaft with respect to the axis of the winding shaft is zero. Said extremum can be either a minimum or a maximum. Having said extremum in said central region of the reinforcement shaft promotes the central acting of the weight countering force. Preferably the extremum of the reinforcement shaft coincides with a central region of the winding shaft once inserted. This is beneficial if the weight acting on the winding shaft is more or less centered. This is generally the case for winding shafts with blinds attached thereto.

In another preferred embodiment, the invention relates to a roller winding mechanism that comprises a shaft reinforcement which is inserted into the roller shaft and anchored firmly to the frame on the side opposite to the drive, the bending direction of the shaft reinforcement being opposite to the expected deflection of the winding shaft and the initial curvature of this reinforcement is such that its deformation along its length is such that its axis at maximum deformation coincides with the axis of the originally undeformed winding shaft and the reinforcement is provided with rolling support bearings spaced apart mutually along the length of winding shaft.

In this embodiment, the weight countering force and the weight acting on the winding shaft will counteract each other entirely. This is advantageous for maintaining a straight winding shaft, regardless of its length, diameter, yield modulus or the weight acting upon it.

In a preferred embodiment, the reinforcement has a round or polygon shape in cross-section. Polygon shapes are suitable for keeping the reinforcement fixed with respect to the rotationally laagered roller winding mechanism. Round shapes are suitable for providing the reinforcement shaft with lagers regardless of orientation of the rolling support bearings with respect to the reinforcement shaft. In a further preferred embodiment, the reinforcement has a circular or regular polygon shape in cross-section. A regular polygon shape is defined by equal angles and sides. A regular polygon shape is advantageous as it allows easier connection of the rolling support bearings onto the reinforcement shaft. Additionally, this allows the use of standard shapes for reinforcement shafts of different lengths and deflections with modular rolling support bearings.

In a preferred embodiment, the drive (8) is a motor, wherein said motor (8) is coupled to said winding shaft (2) and said frame (7). The motor is preferably an electrical motor. The motor is coupled so the winding shaft rotates, yet the frame and the reinforcement shaft stay fixed, when the motor is actuated. In a preferred embodiment, the roller winding apparatus further comprises a power supply unit, electrically coupled to said motor and configured to supply power to said motor. In a further preferred embodiment, the motor is comprised within the winding shaft (2). This is considered more aesthetical, as the view for the consumer is limited to the winding shaft and blind. It delivers a motorized roller winding apparatus which doesn't hang or bend and doesn't have an additional box or connection.

In a preferred embodiment, the winding shaft is made of aluminium, steel preferably rolled form steel, composite materials such as glass fiber or other tubular materials. Aluminium is a strong, durable yet lightweight material. Reducing the weight of the roller winding apparatus is frequently desired and allows easier and more safe mounting of the roller winding apparatus to a surface.

In a preferred embodiment, the reinforcement shaft is made of a material with a high Young modulus. This is advantageous as materials with a higher Young modulus require less curvature and straightening for an equal weight countering force when straightened and inserted into the winding shaft. In a preferred embodiment, the young modulus is at least 180 GPa, preferably at least 190 GPa, more preferably at least 195 GPa, more preferably at least 200 GPa, most preferably at least 205 GPa.

In a preferred embodiment, the reinforcement shaft is made of a material with a high yield strength. Preferably, the yield strength measured to the offset yield point of 0.2% plastic strain $R_{p0.2}$ is at least 250 MPa, preferably at least 300 MPa, more preferably at least 350 MPa, more preferably at least 400 MPa, more preferably at least 450 MPa, more preferably at least 500 MPa, more preferably at least 550 MPa, more preferably at least 600 MPa, more preferably at least 650 MPa, more preferably at least 700 MPa, most preferably at least 750 MPa. A high yield strength is beneficial for producing a large weight countering force by a reinforcement shaft. This makes higher yield strengths beneficial for reinforcement shafts with a higher weight, longer length or smaller diameter.

In another preferred embodiment, the reinforcement shaft is made of steel, preferably roll formed steel, composite materials such as glass fiber or other tubular materials.

Steel has a high Young modulus and high yield strength. This is particularly advantageous for the reinforcement shaft. In a more preferred embodiment, high strength alloys such as ASTM A514 steel are used.

The preferred shape of the reinforcement shaft, before inserting into the winding shaft, will now be described in more detail. If we represent the central axis of the reinforcement shaft as a curve, this curve is preferably planar. That is to say it fits within a plane. This is beneficial for counterbalancing unidirectional forces. As weight, due to the nature of gravity can be considered a unidirectional force for this purpose regardless of the orientation of the blinds, it is beneficial for the axis of the reinforcement shaft to be a planar curve.

In a preferred embodiment, at least a central part of the axis of the reinforcement shaft can be fitted to a catenary shape. More preferably, the shaft can be fitted to a weighted catenary shape. In particular, this weighted catenary shape can be represented by the curve $y=a \cosh(x/b)$, wherein cosh is the hyperbolic cosine function, x and y are variables representing the curve and a and b are parameters. If a=b then the catenary is not weighted. This can be used as approximation if the winding shaft weights significantly more than the blinds. However, if the weight of the winding shaft and reinforcement shaft is small compared to the total weight acting on the winding shaft, a and b should be treated as independent parameters.

This shape is preferred as any force of tension or compression exerted onto the winding shaft with said shape is parallel to the shape, offset by the weight it is to support. These curves are known in the arts for distribution of weight and/or stress along an arc.

In another embodiment, when representing at least a central part of the axis of the reinforcement shaft as a curve, this curve can be approximated by the shape of a parabola, represented by the curve $y=a x^2$. In a preferred embodiment, the ideal catenary can be approximated by a Taylor expansion. More preferably, said Taylor expansion only comprises components with an even exponent. This is preferable to obtain a symmetrical curve. The reinforcement shaft is preferably symmetrical assuming the winding shaft is to hang perpendicular to gravity. Approximating the shape of the reinforcement shaft as a parabola or Taylor series is easier to control and model, thus allows for easier production.

The reinforcement shaft comprises a central part and two ends. The central part is, as described above, ideally fitted to a certain curve. However the ends do not need to conform to said curve. These ends may be curved differently. These ends may be straight, in order to allow for easy fixation with respect to a frame, suitable to keep the reinforcement shaft in place.

The winding shafts according to the invention will be defined in function of the linear weight they can support. This linear weight is considered to approximate the weight of a blind, possibly with additional loads. As such, it is measured or tested for loads which are uniform and span the entire length of the winding shaft. The height of a blind, the specific weight of a blind and the additional weight of a possible load attached to the blind can be calculated from this.

In a preferred embodiment, the winding shaft has an outer diameter smaller than 50 mm, preferably smaller than 47 mm, most preferably smaller than 45 mm, and a length of at least 4 m, preferably at least 4.5 m, most preferably at least 5 m. This is suitable for supporting a linear weight of at least 1250 g/m.

In a preferred embodiment, the winding shaft has an outer diameter smaller than 40 mm, preferably smaller than 35 mm, more preferably smaller than 32 mm, most preferably smaller than 30 mm, and a length of at least 3.5 m, preferably at least 4 m, most preferably at least 4.5 m. This is suitable for supporting a linear weight of at least 500 g/m.

In a preferred embodiment, the winding shaft has an outer diameter smaller than 100 mm, preferably smaller than 80 mm, more preferably smaller than 78 mm, most preferably smaller than 75 mm, and a length of at least 5 m, preferably at least 6 m, most preferably at least 7 m. This is suitable for supporting a linear weight of at least 4000 g/m.

These preferred embodiments allow hanging blinds with a high linear weight onto long winding shafts with a low outer diameter. This allows the roller blind apparatus to be condensed into a smaller space and look aesthetically pleasing. Despite this, the winding shaft will not bend under the linear weight over time due to the reinforcement shaft. For the same tube length and diameter, being able to support a higher linear weight is advantageous to provide blinds which are for example longer or have a higher specific weight. Blinds with a higher specific weight allow the use of heavier materials which might be warmer, better insulated, less translucent or simply to provide more options.

In a second aspect the invention relates to a kit suitable for constructing a roller winding mechanism, comprising:

- a winding shaft (2) which is created as a tube,
- a shaft reinforcement (6) which is curved, which is configured to be inserted into the winding shaft (2), and
- rolling support bearings (10) configured to be mutually spaced apart along the length of the shaft reinforcement (6).

In a preferred embodiment of the second aspect, the invention relates to a kit suitable for constructing a roller winding mechanism, comprising:

- a frame (7),
- a winding shaft (2) which is created as a tube attached at one end to a drive (8) which is configured to be coupled to the frame (7) and at its other end mounted on a bearing on a pivot fixed to the frame (7),
- a shaft reinforcement (6) which is configured to be inserted into a roller winding shaft (2) and anchored firmly to said frame (7) on the side opposite to said drive (8), the bending direction of the shaft reinforcement (6) being opposite to the expected deflection of the winding shaft (2) and the initial curvature of this reinforcement (6) is such that its deformation along its length is such that its axis at maximum deformation coincides with the axis of the originally non-deformed winding shaft (2) and
- rolling support bearings (10) configured to be mutually spaced apart along the length of the shaft reinforcement (6).

The kit of the second aspect can advantageously be used to construct and mount a roller winding mechanism according to the first aspect. Furthermore, this kit may be used with various types of blinds if so desired. This allows the kit to be used as a modular piece along with various different blinds, which may have different weights, specific weights or densities, heights, colours and textures.

In a preferred embodiment, the kit further comprises a blind (4) suitable for attaching to said winding shaft (2). In a more preferred embodiment, kit comprises a blind which is attached to said winding shaft. Preferably the blind is rolled around said winding shaft. In another preferred embodiment, the shaft reinforcement (6) is provided with said rolling support bearings (10) mutually spaced apart along its length and said drive (8) are inserted into said roller winding shaft (2). The pre-construction of the blind and winding shaft assembly and/or the construction of the reinforcement and winding shaft assembly makes the construction and mounting of the roller winding apparatus easier. It furthermore prevents mistakes in construction by the consumer or roller blind expert mounting said roller blind apparatus.

In FIG. 1, is the perspective view of winding shaft 2 of the roller blind, which is part of the roller winding mechanism 1. This can be seen in detail in FIGS. 5 and 6. A protruding part of the drive 8 can be seen. On the surface of the winding shaft 2 an anchoring groove 11 can be provided longitudinally for anchoring one end of the wound roller blind.

Figure 2:
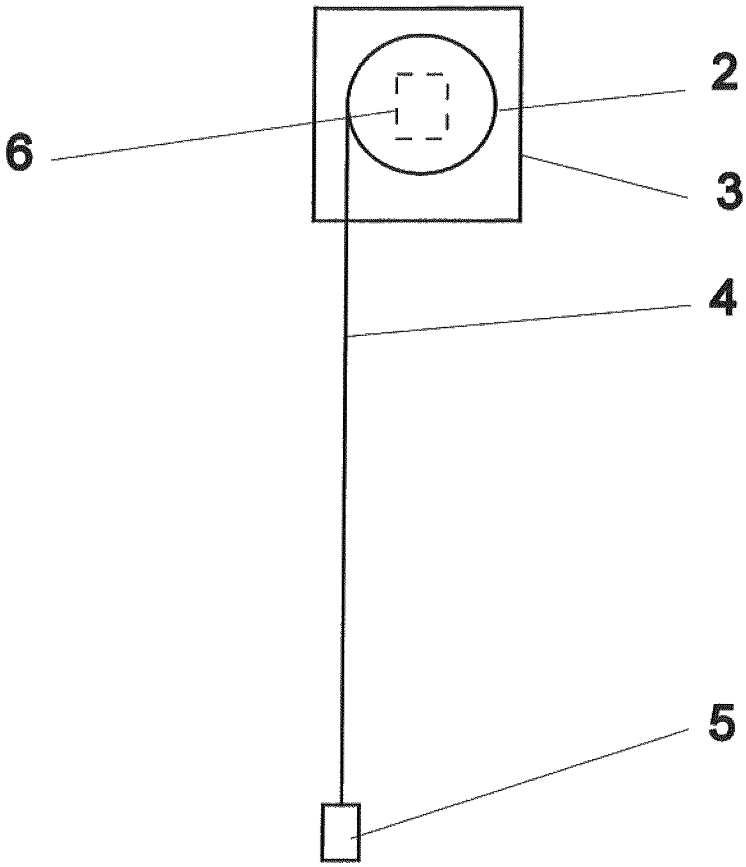
FIG. 2 is a schematic cross-sectionional view of the entire roller shutter.
Figure 3:
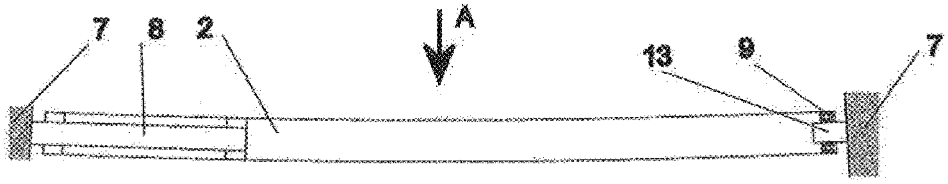
FIG. 3 is a schematic cross-sectional view of the roller winding shaft according to the prior art.

FIG. 2 is a schematic side view of an embodiment of a roller blind. The basis is the winding shaft 2 onto which a screening element 4, which is a lamellar armor, fabric or a foil, is wound, which is provided at its free end with a load 5 to be tensioned. The wound screening element 4 is hidden in the cassette 3. A dotted line indicates the cross-section of a reinforcement 6, which will be discussed later. FIG. 3 shows the winding shaft 2 according to the prior art slightly deformed by its own weight, the weight of the screening element 4 and the weight of the load 5. The arrow A indicates the deflection direction of the winding shaft 2. The winding shaft 2 is connected at one end to the drive 8 which is connected to a frame 7 or to the wall and at the other end is connected to a pin 13 which is fixed to the frame 7. Anchoring bearing 9 is provided on the pin 13 with its inner ring, whereas on the outer ring the winding shaft 2 is arranged with its inner diameter. The drive 8 may be manual or as an electric motor.

Figure 4A:
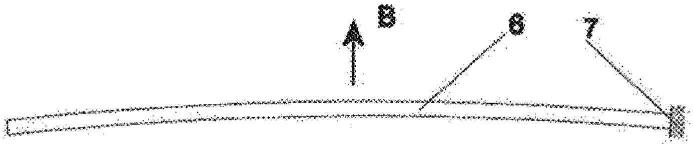
FIG. 4 is a view of a reinforcement of a roller blind winding mechanism according to the invention.
Figure 4B:
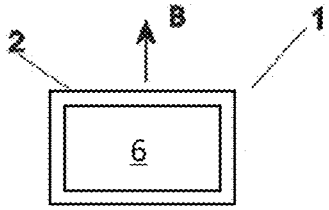

FIGS. 4A and 4B show a curved or prestressed shaft reinforcement 6 which is part of the winding mechanism 1 according to the invention. This reinforcement 6 increases the stiffness of the shaft 2 in the bending plane. The shaft reinforcement 6 is inserted into the roller shaft 2 and anchored firmly to the frame 7 on the opposite side to the drive 8, so that it does not rotate and still counteracts the force causing the shaft 2 to deflect even when rotated. The direction of deflection of the shaft reinforcement 6 is indicated by the arrow B and is opposite to the expected deflection of the winding shaft 2. The initial curvature or prestressing of this reinforcement 6 is chosen so that its deformation along its length is such, that its axis at maximum deformation will coincide with that originally non-deformed winding shafts 2 and therefore the winding shaft 2 is arranged as straight during operation. Fine-tuning or compensating for the remaining deformation after inserting the reinforcement 6 is done by adjusting the weight or distributing the load 5.

Figure 5:
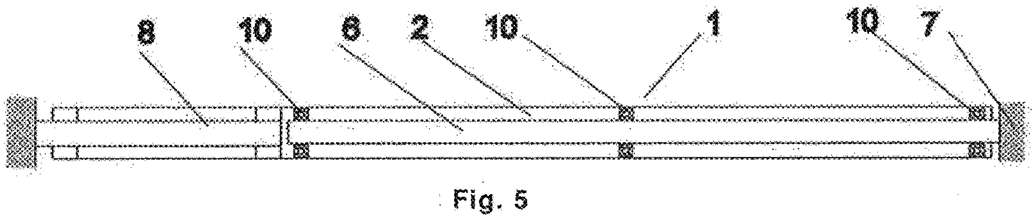
FIG. 5 is a cross-section of winding shaft reinforcing system disposed in the roller winding shaft of FIG. 1

FIG. 5 is a schematic cross-sectional view of the roller winding mechanism 1 arranged in the winding shaft 2 of the roller shutter of FIG. 1 The shaft reinforcement 6 is anchored at the opposite edge to the drive 8. The reinforcement 6 replaces the function of the pin 13. The winding shaft 2 is supported by the bearings 10 spaced mutually apart along the length by the, so that the winding shaft 2 can rotate around the stationary reinforcement 6.

Figure 6:
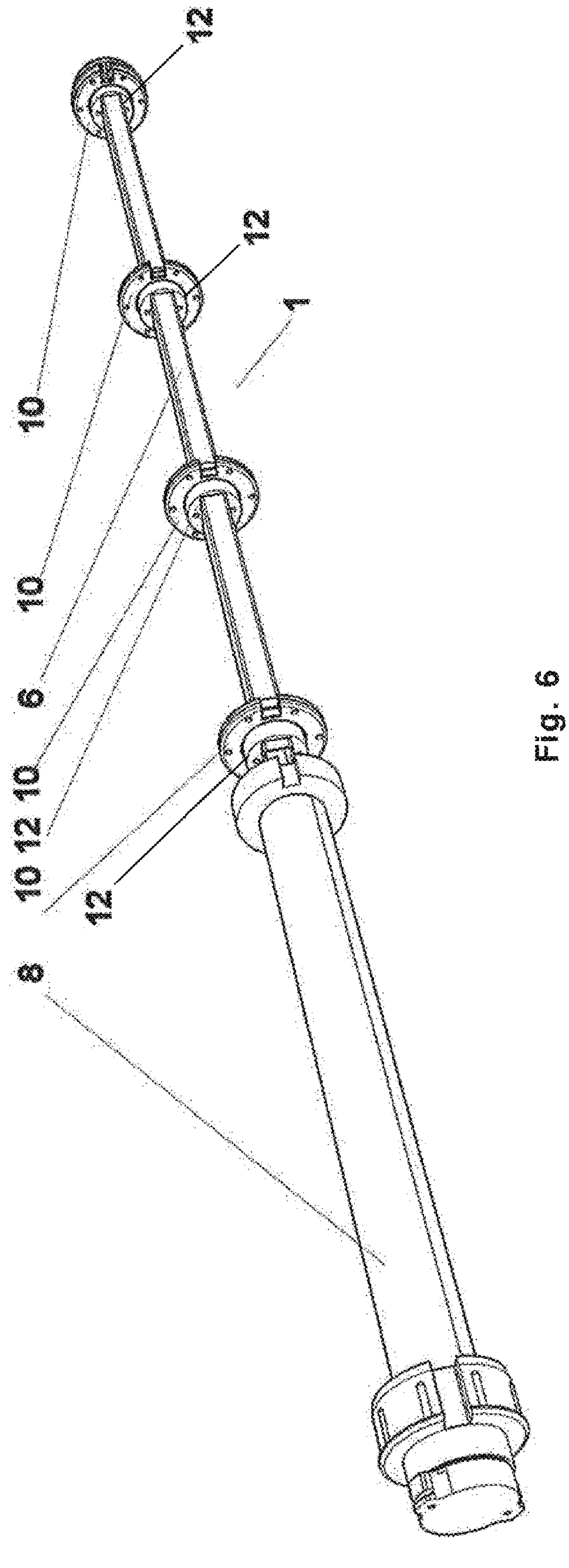
FIG. 6 is a perspective view of a reinforcing system without a winding shaft.

FIG. 6 shows a perspective view of the uncovered roller winding mechanism 1 and the arrangement of the support bearing 10 at the edge of the reinforcement 6 and the placement of further support bearings 10 along the length of the reinforcement 6 can be clearly seen. The support bearings 10 are designed as rolling bearings and are mutually spaced apart at certain distances along the length. The reinforcement 6 preferably has a round, square, rectangular or polygonal cross-section, and on the inner diameters of the support bearings 10 and on the outer surface of the reinforcement 6 inserts 12 are formed having an aperture corresponding to the shape and size of the outer surface of the reinforcement 6 of the winding shaft 2, and a cylindrical outer surface corresponding to the shape and size of the inner surface of the inner ring of the bearings 10 to allow rotation of the winding shaft 2 relative to the reinforcement 6.

INDUSTRIAL APPLICABILITY

Roller winding mechanism can be applied wherever it is necessary to increase the resistance of the winding shaft against deflection caused by unidirectional load, especially for various roller blind shading systems such as fabric roller blinds, screen blinds, roller window, shutter blinds, roller garage doors and roller shutters especially of large width. It can be used wherever there is an excessive unwanted deflection of the winding shaft, where a larger amount of fabric needs to be wound and it is necessary to use a smaller diameter shaft, where long shafts need to be used or where larger shaft diameter cannot be used with regard to installation dimensions or size of the cassette and therefore the winding shaft needs to be reinforced.

The invention is further described by the following non-limiting examples which further illustrate the invention, and are not intended to, nor should they be interpreted to, limit the scope of the invention.

EXAMPLES

Example 1

A roller blind using an aluminium tube with a diameter of 47 mm and a length of 5.0 meters is used. Inserted into this tube is a steel, curved reinforcement shaft provided with 8 plain bearings spread along its length. The curvature of the central part of the reinforcement was shaped as a weighted catenary. Attached to this winding tube is a fabric with a height of 2.700 meter and a specific weight of 450 gram per square meter.

Example 2

A roller blind using an aluminium tube with a diameter of 32 mm and a length of 4 meters is used. Inserted into this tube is a steel, curved reinforcement shaft provided with 6 plain bearings spread along its length. Attached to this winding tube is a fabric with a height of 2.700 meter and a specific weight of 150 gram per square meter.

Example 3

A roller blind mechanism using an roll formed steel tube with a diameter of 78 mm and a length of 6 meter is used. Inserted into this tube is a steel, curved reinforcement shaft provided with 12 rolling element bearings spread along its length. Attached to this winding tube is a fabric with a height of 3 meters and a specific weight of 1200 gram per square meter.

Example 4

A roller blind mechanism using an roll formed steel tube with a diameter of 63 mm and a length of 6 meter is used. Inserted into this tube is a steel, curved reinforcement shaft provided with rolling element bearings spread along its length. Attached to this winding tube is a fabric with a height of 6 meters and a specific weight of 600 gram per square meter.

Example 5

A building kit for the roller blind of 3 is provided. The kit is provided in a box of 6.10 meters by 103 mm by 103 mm. The kit is provided with or without guide profiles and guide cables to attach the tube. The tube is delivered with or without electric motor within the winding tube. When delivered with an electric motor, the steel, curved reinforcement is shortened. However, it is curved more to offset the reduced length.

Example 6

A building kit for the roller blind of 3 is provided. The kit is provided in a box of 6.10 meters by 131 mm by 131 mm. The kit is provided with or without guide profiles and guide cables to attach the tube. The tube is delivered with or without electric motor within the aluminium winding tube. When delivered with an electric motor, the steel, curved reinforcement is shortened. However, it is curved more to offset the reduced length.

The invention claimed is:

1. A roller winding mechanism comprising a winding shaft which is created as a tube, wherein the roller winding mechanism comprises a shaft reinforcement which has a length and a curvature having an arc, said shaft reinforcement is provided with support bearings mutually spaced apart along the length of the shaft reinforcement, and said shaft reinforcement is inserted into said winding shaft so that said winding shaft can rotate independently from said shaft reinforcement, wherein, prior to insertion into the winding shaft and when the shaft reinforcement is positioned whereby the length is horizontal and the arc is vertical, the curvature of the shaft reinforcement is such that a vector of a weight-countering force from an elastic straightening of the shaft reinforcement under load has a component opposite to a direction of a deflection of the winding shaft under load, wherein the mechanism has an unloaded state and a loaded state, wherein in the unloaded state, the shaft reinforcement is curved with a central part of the shaft reinforcement being higher than its edge parts, and in the loaded state, a load element comprising at least a blind is applied to the mechanism and the shaft reinforcement is elastically deformed by weight of the load element wherein the shaft reinforcement is straighter than in the unloaded state.

2. The roller winding mechanism according to claim 1, wherein the mechanism further comprises a frame, wherein the winding shaft is attached at one end to a drive which is coupled to the frame and at its other end mounted on a bearing on a pivot fixed to the frame, wherein the shaft reinforcement is anchored firmly to the frame on a side opposite to the drive, wherein the curvature of the shaft reinforcement is such that the shaft reinforcement is straightened when inserted into the winding shaft and loaded.

3. The roller winding mechanism according to claim 1, wherein the shaft reinforcement has a shape of a hollow or solid profile and between an inner diameter of the support bearings and an outer surface of the shaft reinforcement there are inserts with holes corresponding to a cross-sectional shape and size of the shaft reinforcement, and a cylindrical outer surface of the inserts corresponds to a shape and size of an inner surface of an inner ring of the support bearings to allow rotation of the winding shaft relative to the shaft reinforcement.

4. The roller winding mechanism according to claim 1, wherein the shaft reinforcement has a round or polygon shape in cross-section.

5. The roller winding mechanism according to claim 1, wherein the shaft reinforcement has a circular or regular polygon shape in cross-section.

6. The roller winding mechanism according to claim 1, wherein the winding shaft is made of aluminium, steel, roll formed steel, or a composite.

7. The roller winding mechanism according to claim 1, wherein the shaft reinforcement is made of steel, roll formed steel, a composite, or titanium.

8. The roller winding mechanism according to claim 1, wherein the winding shaft has an outer diameter smaller than 50 mm, and a length of at least 4 m, suitable for supporting a linear weight of at least 1250 g/m.

9. The roller winding mechanism according to claim 1, wherein the winding shaft has an outer diameter smaller than 40 mm, and a length of at least 3 m, suitable for supporting a linear weight of at least 500 g/m.

10. The roller winding mechanism according to claim 1, wherein the winding shaft has an outer diameter smaller than 100 mm, and a length of at least 5 m, suitable for supporting a linear weight of at least 4000 g/m.

11. A kit suitable for constructing a roller winding mechanism, comprising:

a winding shaft which is created as a tube, a shaft reinforcement which has a length and a curvature having an arc and is configured to be inserted into the winding shaft, and rolling support bearings configured to be mutually spaced apart along the length of the shaft reinforcement, wherein the shaft reinforcement is insertable into said winding shaft so that said winding shaft can rotate independently from said shaft reinforcement, wherein, when the shaft reinforcement is positioned whereby the length is horizontal and the arc is vertical, the curvature of the shaft reinforcement is such that a vector of a weight-countering force from an elastic straightening of the shaft reinforcement under load has a component opposite to a direction of a deflection of the winding shaft under load, wherein the mechanism has an unloaded state and a loaded state, wherein in the unloaded state, the shaft reinforcement is curved with a central part of the shaft reinforcement being higher than its edge parts, and in the loaded state, a load element comprising at least a blind is applied to the mechanism and the shaft reinforcement is elastically deformed by weight of the load element wherein the shaft reinforcement is straighter than in the unloaded state.

12. The kit suitable for constructing a roller winding mechanism according to claim 11, further comprising a frame, wherein the winding shaft is attached at one end to a drive which is configured to be coupled to the frame, and at its other end the winding shaft is mounted on a bearing on a pivot fixed to the frame, wherein the shaft reinforcement is anchored firmly to said frame on a side opposite to the drive, wherein the curvature of the shaft reinforcement is such that the shaft reinforcement is straightened when inserted into the winding shaft and loaded.

13. The kit according to claim 11, wherein the kit further comprises a blind suitable for attaching to the winding shaft.

14. The kit according to claim 12, wherein the shaft reinforcement is provided with the rolling support bearings mutually spaced apart along the length of the shaft reinforcement and the drive is inserted into the roller winding shaft.

* * * * *